United States Patent
Eibler

(10) Patent No.: US 6,832,970 B2
(45) Date of Patent: Dec. 21, 2004

(54) REDUCTION GEAR FOR A STARTER-GENERATOR OF AN INTERNAL COMBUSTION ENGINE

(75) Inventor: Gerhard Eibler, Heiligenkreuz (AT)

(73) Assignee: Tesma Motoren und Cetriebetechnik Ges. m.b.H., Preding (AT)

(*) Notice: Subject to any disclaimer, the term of this patent is extended or adjusted under 35 U.S.C. 154(b) by 30 days.

(21) Appl. No.: 10/276,630

(22) PCT Filed: May 17, 2001

(86) PCT No.: PCT/AT01/00153
§ 371 (c)(1),
(2), (4) Date: Nov. 18, 2002

(87) PCT Pub. No.: WO01/88369
PCT Pub. Date: Nov. 22, 2001

(65) Prior Publication Data
US 2004/0038769 A1 Feb. 26, 2004

(30) Foreign Application Priority Data
May 17, 2000 (AT) ..................................... GM361/2000

(51) Int. Cl.⁷ .................................................. F16H 3/70
(52) U.S. Cl. ...................................... 475/177; 475/175
(58) Field of Search ............................. 475/5, 13, 149, 475/301, 312, 313, 162, 175, 177

(56) References Cited

U.S. PATENT DOCUMENTS

| | | | | |
|---|---|---|---|---|
| 668,135 A | * | 2/1901 | Warren | 475/177 |
| 1,634,168 A | * | 1/1927 | Ahlm | 475/177 |
| 1,619,127 A | * | 3/1927 | Jeffries | 475/177 |
| 1,715,778 A | * | 6/1929 | Orr | 475/177 |
| 1,861,376 A | * | 5/1932 | Beall | 475/177 |
| 2,481,627 A | * | 9/1949 | Sharpe | 475/177 |
| 2,795,155 A | * | 6/1957 | Bade | 475/177 |
| 4,282,777 A | * | 8/1981 | Ryffel et al. | 475/177 |
| 4,762,025 A | * | 8/1988 | Lew | 475/177 |
| 4,807,494 A | * | 2/1989 | Lew | 475/177 |
| 4,841,810 A | * | 6/1989 | Lew | 475/177 |
| 4,878,401 A | * | 11/1989 | Chung | 475/153 |
| 4,943,268 A | * | 7/1990 | Eisenmann et al. | 475/95 |
| 5,358,456 A | * | 10/1994 | Deppert et al. | 475/154 |
| 5,418,400 A | * | 5/1995 | Stockton | 475/13 |
| 5,558,592 A | * | 9/1996 | Honlinger et al. | 475/285 |
| 5,820,504 A | * | 10/1998 | Geralde | 475/177 |
| 2002/0117860 A1 | * | 8/2002 | Man et al. | 475/5 |

FOREIGN PATENT DOCUMENTS

| | | |
|---|---|---|
| EP | 0 384 808 A | 8/1990 |
| EP | 0 391 386 A | 10/1990 |
| WO | WO 99 23398 A | 5/1999 |

* cited by examiner

*Primary Examiner*—Sherry Estremsky
(74) *Attorney, Agent, or Firm*—Clark Hill PLC

(57) ABSTRACT

A reduction gear for a starter-generator of an internal combustion engine, wherein the starter-generator is functionally linked with the crankshaft (2) via a drive belt (6). A planetary gear is mounted in the force-transmitting path between the crankshaft (2) and a first belt pulley (6) that is coaxial to the crankshaft. The aim is to create a reduction gear which provides the gear ratio required for the starting mode and which can be switched in such a manner that it can be operated in any mode of operation. To this end, the reduction gear (8) is a planetary stage that includes a housing (10), an internal gear (11), a sun gear (14), a cage (15) and a planetary ring (16) with internal (18) and external (17). The internal gear intermeshes with the external teeth (17) of the planetary ring (16) and is functionally linked with the crankshaft (2) of the internal combustion engine. The sun gear (14) intermeshes with the internal teeth (18) of the planetary ring (16) and is stationarily linked with the housing (10) via a first coupling (19). The cage (15) is provided with eccentric bearings (42, 43) for the planetary ring (16) and is stationarily linked with the first belt pulley (7). The cage can be stationarily linked with one of the members (11) of the planetary stage via a second coupling (20).

10 Claims, 2 Drawing Sheets

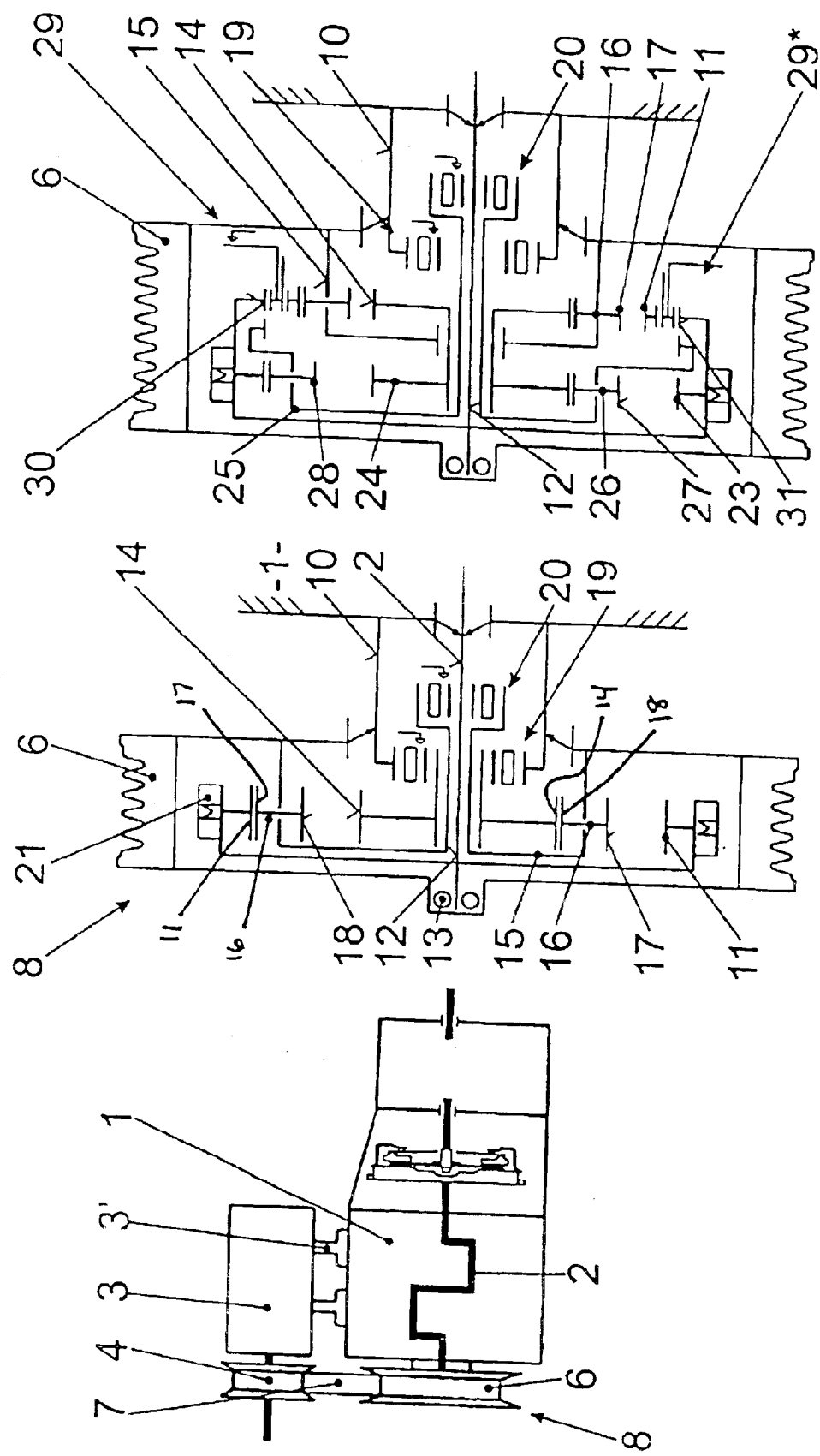

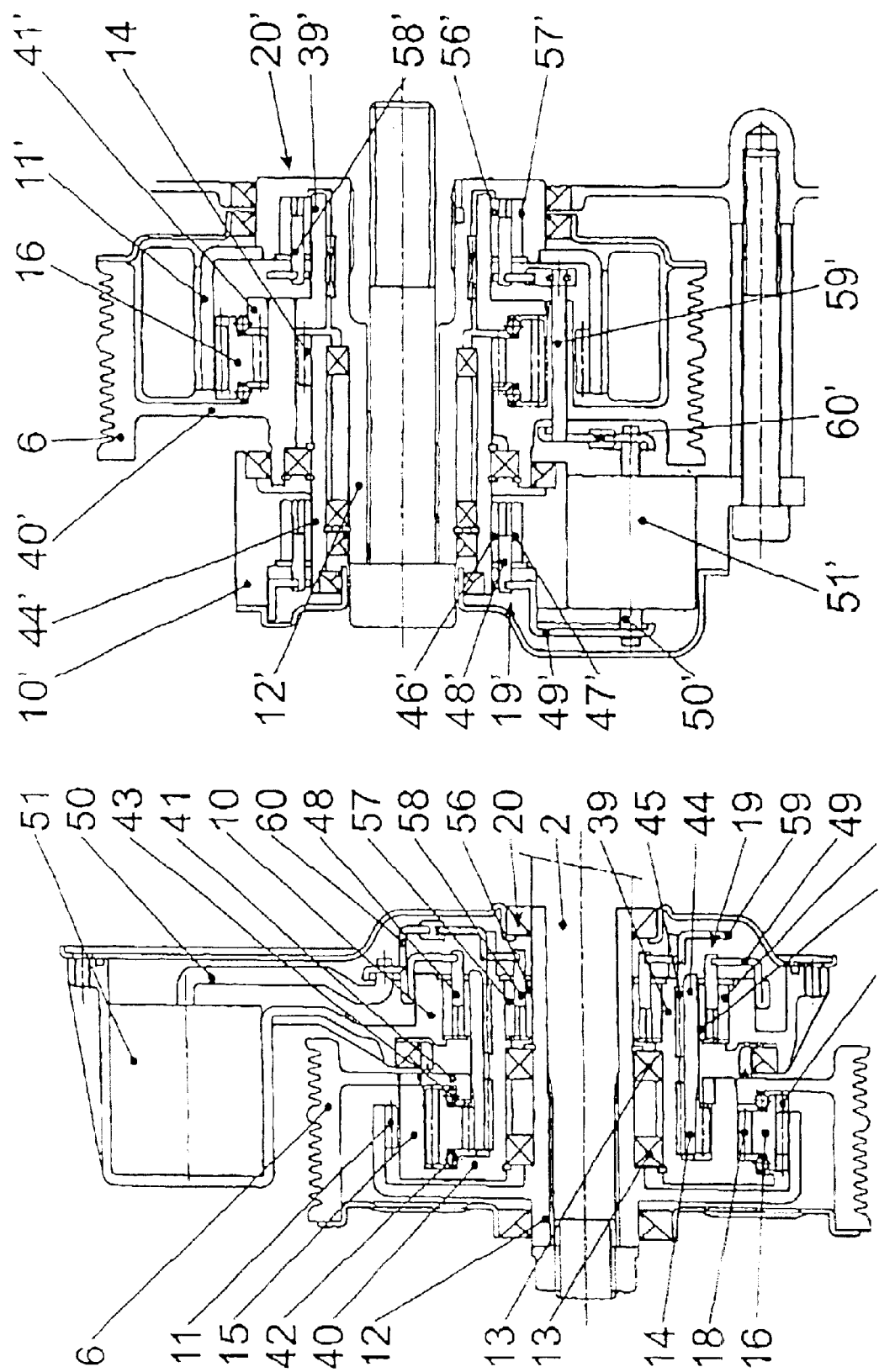

REDUCTION GEAR FOR A STARTER-GENERATOR OF AN INTERNAL COMBUSTION ENGINE

FIELD OF THE INVENTION

The invention relates to a reduction gear for the starter-generator of an internal combustion engine, the starter-generator being drive-connected to its crankshaft via a belt drive and the reduction gear being a planetary gear train arranged in the transmission path between the crankshaft and a first belt pulley coaxial with the crankshaft.

BACKGROUND OF THE INVENTION

The effort to reduce the cost and weight of motor vehicles and their engines extends to the auxiliaries, particularly where these are heavy and expensive electrical machines that are never in operation simultaneously. A starter-generator connected to the crankshaft via a belt drive was already being used in small cars (PUGH 500) some decades ago. In larger, high-compression engines a high torque with lower speed is needed for starting, whereas generator operation requires a high speed. A multistep reduction gear is therefore needed between crankshaft and starter-generator.

The Report on the Technical Symposium "Electrical Machine in the Power Train" of Sep. 4, 1999, organized by the Technical Universities of Chemnitz and Graz, discloses the use of a two-stage planetary gear train, which is arranged either coaxially with the crankshaft, preferably in the belt pulley, or coaxially with the starter-generator. In this it is proposed that the change-over should occur automatically due to the helical toothing of the planetary gear train as a function of the torque flow direction. Apart from the sluggishness of the change-over, however, this does not permit control of all possible engine operating conditions and their transitional states. One only has to think of rapidly revving up the engine after successful starting, of rapid backing-off of the throttle from high engine speed, or backfiring in the event of mistimed ignition. It is moreover desirable to be able to interrupt the connection via the reduction gear in certain operating conditions.

The patent specification U.S. Pat. No. 5,132,604 likewise discloses the arrangement of a planetary gear train as reduction gear for a starter-generator on the crankshaft axis. In this an overrunning clutch, via which the entire power output is therefore transmitted, is already inserted between planet carrier and output shaft. This calls for very large overrunning clutches, which are correspondingly slow to switch. Planetary gear trains, for their part, present problems, since their geometry makes the desired optimum reduction of between 0.5 and 0.2 for the same directions of rotation in both gears unfeasible. In addition, the costs and weight of planetary gear trains and the overall space taken up by these are still considerable. The latter leads to very large belt pulleys where the planetary gear train is to be enclosed by one.

WO-OS 99/23398 discloses a multistage manual shift transmission having multiple planetary sets arranged in series with a "coplanar" planet wheel. In this the gears are changed by means of hydraulically actuated friction clutches, or band brakes and overrunning clutches.

SUMMARY OF THE INVENTION

The object of the invention is to design a reduction gear of the type outlined in the introductory part, so that the required gear ratio is achieved with reduced costs and dimensions and can be changed so that it is present in all conceivable operating conditions. According to the invention this is achieved by the following design features:

a) The planetary gear train has a housing and a planetary gear stage comprising an internal gear, a sun gear, a cage and a planetary ring with internal teeth and external teeth, b) the internal gear meshes with the external teeth of the planetary ring and is drive-connected to the crankshaft, c) the sun gear meshes with the internal teeth of the planetary ring and can be rotationally locked to the housing by means of a first clutch, corresponding to the starter position, d) the cage has eccentric bearings for the planetary ring, is rotationally locked to the first belt pulley, and is rotationally locked by means of a second clutch to one of the members of the planetary gear train, so that the planetary gear train rotates as a whole, corresponding to the generator position.

Planetary gear trains according to feature a) are cheaper and lighter than conventional planetary gear trains and take up less overall space. This applies in particular to the increment between direct and geared running in the same direction of rotation required in the application forming the subject matter. This allows them to be fitted inside the belt pulley. In gears for driving the wheels of motor vehicles, the increments are significantly smaller.

These advantages are further enhanced by the attachment of the members of this planetary gear train according to b) and c). Despite the high torque on the large radius of the internal gear required for starting, the drive connection of internal gear and crankshaft only results in small tooth forces. The sun gear serves merely as reaction member, being beneficial to the clutch connection. Coupling to the fixed housing creates the gear ratio for starting; in operation of the generator it is not under load.

Combining cage and belt pulley in accordance with d) enables the bearing forces produced by the belt tension to be neatly absorbed. The second clutch can also readily be connected between the cage and another member of the planetary gear train. This means that in generator operation the entire gear mechanism rotates as a whole, the losses being minimal. As for the clutches, virtually all known types are in principle feasible: friction disk clutches, positively interlocking clutches with claws or teeth, band or wrap spring clutches, electromagnetic clutches, overrunning clutches with roller or clamping elements, centrifugal clutches being a possible alternative or addition.

In a preferred and particularly simple design, the internal gear is rotation-ally locked to the crankshaft and the cage can be rotationally locked to the internal gear by means of a second clutch. This is the most common case with a single transmission stage for engine starting. In a first embodiment the first and second clutch are overrunning clutches, the first clutch closing when the cage is being driven, and the second clutch closing when the cage is driving. First and second clutches are therefore fitted in opposition. This therefore provides direct drive in generator operation and an optimum gear ratio for starting. As soon as the engine begins to run up after starting, the change-over in the generator occurs rapidly and automatically but nevertheless smoothly. therefore fitted in opposition. This therefore provides direct drive in generator operation and an optimum gear ratio for starting. As soon as the engine begins to run up after starting, the change-over in the generator occurs rapidly and automatically but nevertheless smoothly.

In one development, the two clutches are remote-controlled clutches, the first clutch being closed for starting of the internal combustion engine and the second clutch being closed in normal generator operation, all of the aforementioned clutches again being feasible, including remote-controlled overrunning clutches, which through actuation can be brought into the opened position, in which they remain even if the torque direction is reversed. As a result, closing of the overrunning clutch cannot occur even in the event of sudden engine deceleration or misfiring. In addition, other auxiliaries driven by the belt drive can therefore be kept in operation even when the internal combustion engine is at a standstill.

The remote control may be achieved in widely varying ways, but the two clutches are preferably operated by electrical actuators, which are activated by a control as a function of operating conditions. This provides a high level of reliability even in extreme and abnormal operating conditions.

The gear constellation according to the invention also gives the control the facility, when the internal combustion engine is switched off and under certain temperature conditions, for opening both clutches and allowing the starter-generator to run as a motor. The belt drive, in fact, often also serves other auxiliaries, such as a coolant pump, a radiator fan or the compressor of an air-conditioning system. The neutral position of the gear offers the facility for driving all of these auxiliaries from the starter-generator when the engine is at a standstill. The temperature condition may be the coolant temperature or the ambient temperature, for example.

In a development of the invention, the reduction gear has a further engageable planetary gear stage comprising a further internal gear, a further sun gear, a further cage and a further planetary ring with internal teeth and external teeth, via which gear stage the internal gear can be connected to the crankshaft. The further planetary gear stage permits a further gear ratio and hence two different gear ratios for starting, for example: one for starting with the engine hot and one for cold-starting in winter. This development preferably resides in the fact that a) The further internal gear meshes with the external teeth of the further planetary ring, is drive-connected to the crankshaft and can be connected by means of a third clutch to the internal gear.

b) The further sun gear meshes with the internal teeth of the further planetary ring and together with the sun gear can be rotationally locked to the housing by means of the first clutch.

c) The further cage has eccentric bearings for the further planetary ring, can be rotationally locked to the internal gear by means of the third clutch (cold starting), and when rotating as a whole can be rotationally locked by means of the second clutch to one of the members of the planetary gear train (generator).

When the further internal gear is connected to the internal gear (of the first planetary gear stage) in accordance with a), the second planetary gear stage is bypassed and rotates idly as a whole. This is the position for ordinary starting or hot-starting of the engine. The two sun gears both connected to the first clutch (b) make manufacturing and operation simpler; starting position in both starting gear ratios means that the first clutch is closed. When the third clutch in accordance with c) establishes the connection between the further cage and the internal gear (of the first planetary gear stage) the reduction gear is in the position for cold-starting of the engine, that is with a particularly high gear ratio.

This third clutch is a clutch having two switching positions, which is controlled by the control as a function of a temperature. As a result, in cold-starting the larger gear ratio is automatically selected, thereby facilitating breakaway of the engine without jeopardizing the power supply of a starter motor.

BRIEF DESCRIPTION OF THE DRAWINGS

The invention will be described and explained below with reference to figures, of which:

FIG. 1 shows a diagram of an arrangement of the reduction gear according to the invention, FIG. 2 shows a diagram of a reduction gear according to the invention, FIG. 3 shows a diagram of a two-stage development of the reduction gear according to the invention.

FIG. 4 shows a longitudinal section through a first embodiment of the reduction gear according to the invention, FIG. 5 shows a longitudinal section through a second embodiment of the reduction gear according to the invention.

DETAILED DESCRIPTION OF THE INVENTION

In FIG. 1, the engine block is denoted by 1, its crankshaft, merely indicated, by 2, the conventionally adjoining clutch and manually shifted transmission not being shown further. A starter-generator 3 is fixed on feet 3' above the engine block 1. Its belt pulley 4 is connected by way of a belt 7 (such as one or more V-belts) to a belt pulley 6 coaxial with the crankshaft 2. The belt drive 4, 6, 7 is intended both for driving the starter-generator as generator and also for starting of the internal combustion engine by the starter-generator 3. In order to achieve the higher torque necessary for this purpose at lower speed on the crankshaft 2, a reduction gear 8 is provided. It is accommodated concentrically with the crankshaft 2, largely inside the belt pulley 6.

The reduction gear 8 is represented diagrammatically in FIG. 2. Its stationary housing or housing part 10 is fixed to the engine block 1. The remainder of the reduction gear 8 is enclosed by the belt pulley 6. The reduction gear 8 itself is formed by a specially constructed planetary gear stage, comprising: an internal gear 11, having an internal gear shaft 12 coaxial with the crankshaft 2 and supported in bearings 13, a sun gear 14, a cage 15, merely indicated and fixed to the belt pulley 6, and a planetary ring 16. The planetary ring 16 has external teeth 17 and internal teeth 18 and encloses the sun gear 14. The inside diameter of the planetary ring 16 is larger than the outside diameter of the sun gear 14, the outside diameter of the planetary ring 16 being smaller than the inside diameter of the internal gear 11. With its external teeth 17, the planetary ring 16 thus meshes with the internal gear 11, and with its internal teeth 18, on the other hand, with the sun gear 14.

The sun gear 14 can be connected by a first clutch 19 to the housing 10, and the cage 15 by a second clutch 20 to the internal gear 11 or the internal gear shaft 12. As for the clutches, all known types are in principle feasible: friction disk clutches, positively interlocking clutches with claws or teeth, band or wrap spring clutches, electromagnetic clutches, overrunning clutches with roller or clamping elements, centrifugal clutches being a possible alternative or addition. In the exemplary embodiment shown they are remote-controlled clutches or overrunning clutches, which is in each case indicated by a small angled arrow. When the clutch 20 is closed for torque flow from the crankshaft 2 to the belt pulley 6, that is in generator operation, the planetary gear stage turns as a whole, the belt pulley 6 rotating at the speed of the crankshaft 2. When the clutch 20 is opened and the clutch 19 is closed, for torque flow from the belt pulley 6 to the crankshaft 2, the sun gear 14 is rotationally locked to the housing 10. The case 15 is the driving member of the planetary gear stage and the internal gear 11 is the driven member, driving the crankshaft 2 at a significantly lower speed and higher torque via the internal gear shaft 12. This is the starting mode. Finally, a vibration absorber 21 is also indicated.

FIG. 3 represents a two-stage development of the reduction gear in FIG. 2. The parts 10 to 20 are identical to those in FIG. 2 and therefore carry the same reference numbers. In addition a further, second planetary gear stage is provided, comprising a further internal gear 23, a further sun gear 24, a further cage 25 and a further planetary ring 26 having external teeth 27 and internal teeth 28. A third clutch 29 is provided for switching between a normal, geared running and a highly geared running for starting the internal combustion engine. In the upper half of the figure, this clutch is shown in the position with normal gear ratio and in the lower half of the figure as 29* in the position in which the gear ratio is especially high, for example in cold starting. In the first position 29 it connects the internal gear 11 to a first clutch plate 30, which is rotationally locked to the further internal gear 23 and to the internal gear shaft 12. In the position 29* it connects the internal gear 11 to a second clutch plate 31, which is part of the further cage 25 or is fixed to the latter. The further cage 25 then drives the crankshaft 2 of the internal combustion engine via the closed clutch 20.

In the actual embodiment according to FIG. 4, the parts familiar from FIG. 2 are again provided with their reference numbers. In practice the cage 15 comprises a left-hand cage wall 40 and a right-hand cage wall 41, in each of which a left-hand and a right-hand ball bearing 42, 43 are eccentrically provided, which rotatably guide the planetary ring 16 in the manner of a pivot enlargement. The planetary 16 thus rotates about an eccentric axis. The cage furthermore has a hollow shaft 39, by means of which it is supported by way of the bearing 43 on the internal gear shaft 12. The sun gear 14 has a collar 44, which is rotatably supported by needle bearings 45 on the hollow shaft 39 of the cage 15.

The first clutch 19 is formed by an inner clutch race 46 on the collar 44 of the sun gear and by an outer clutch race 47 in the housing 10. Fist clutch elements 48 are arranged between them. In the case of a conventional clamping roller overrunning clutch these are roller or clamping elements, and in the case of an externally controllable clutch it is a clutch plate possibly containing roller or clamping elements, which depending on the type of clutch is axially displaceable or rotatable in order to switch the clutch between an opened position, an overrunning position and a closed position. For this purpose a first transmission member 49 is provided, which is controlled by an electrical actuator 51—in this case a solenoid fixed to the housing—via a change-over lever 50.

The second clutch 20 is likewise formed by an inner clutch race 56 and an outer clutch race 57. The former is part of the internal gear shaft 12 or fixed thereto, the second is provided on the inside of the hollow shaft 39 of the cage 15. Clutch elements 58 are again provided between them, these being clamping or roller elements in the case of an uncontrolled overrunning clutch or otherwise a displaceable or rotatable second clutch plate, on which a second transmission member 59 acts, as in the case of the first clutch 19. Since both clutch races 56, 57 are here on rotatable parts, the motion is transmitted by a further actuator, masked by the actuator 51 and therefore not visible in FIG. 4, via a control fork 60.

In general, the variant in FIG. 5 differs from the embodiment just described in that the actuators 51 is here arranged on that side of the reduction gear remote from the engine 1. The reference numbers of the correspondingly modified parts are provided with an apostrophe.

What is claimed is:

1. A reduction gear for the starter-generator of an internal combustion engine, said starter-generator being drive-connected to its crankshaft via a belt drive and the reduction gear being a planetary gear arranged in the transmission path between the crankshaft and a first belt pulley coaxial with said crankshaft characterized in that
   a) The reduction gear (8) has a housing (10) and a planetary gear stage comprising an internal gear (11), a sun gear (14), a cage (15) and a planetary ring (16) with internal teeth (18) and external teeth (17),
   b) the internal gear (11) meshes with the external teeth (17) of the planetary ring (16) and is drive-connected to the crankshaft (2) of the internal combustion engine,
   c) the sun gear (14) meshes with the internal teeth (18) of the planetary ring (16) and can be rotationally locked to the housing (10) by means of a first clutch (19),
   d) the cage (15) has eccentric bearings (42, 43) for the planetary ring (16), is rotationally locked to the first belt pulley (7), and is rotationally locked by means of a second clutch (20) to one of the members (11) of the planetary gear stage, so that the planetary gear stage rotates as a whole.

2. The reduction gear as claimed in claim 1, characterized in that the internal gear (11) is rotationally locked to the crankshaft (2) and that the cage (15) can be rotationally locked to the internal gear (11) by means of the second clutch (20).

3. The reduction gear as claimed in claim 1, characterized in that the first clutch (19) and the second clutch (20) are overrunning clutches, the first clutch (19) closing when the cage (15) is being driven, and the second clutch (20) closing when the cage (15) is driving.

4. The reduction gear as claimed in claim 1 or claim 3, characterized in that the two clutches (19, 20) are remote-controlled clutches, the first clutch (19) being opened and the second clutch (20) closed in normal generator operation, and the second clutch (20) being opened and the first clutch (19) closed for starting of the internal combustion engine.

5. The reduction gear as claimed in claim 4, characterized in that the two remote-controlled clutches (19, 20) are overrunning clutches, which can be brought by a control into the opened position, in which they remain even if the torque direction is reversed.

6. The reduction gear as claimed in claim 4, characterized in that the two clutches (19, 20) arc operated by electrical actuators (51), which are activated by a control as a function of operating conditions.

7. The reduction gear as claimed in claim 6, characterized in that when the internal combustion engine is switched off and under certain temperature conditions, the control allows both clutches (19, 20) to run opened and the starter-generator (8) to run as motor.

8. The reduction gear as claimed in claim 1, characterized in that it has a further engageable planetary gear stage comprising a further internal gear (23), a further sun gear (24), a further cage (25) and a further planetary ring (26) with internal teeth (28) and external teeth (27), via which gear stage the internal gear (11) can be connected to the crankshaft (2).

9. The reduction gear as claimed in claim 8, characterized in that a) The further internal gear (23) meshes with the external teeth (27) of the further planetary ring (26), is drive-connected to the crankshaft (2) and can be connected by means of a third clutch (29) to the internal gear (11), b) The further sun gear (24) meshes with the internal teeth (28) of the further planetary ring (26) and together with the sun gear (14) can be rotationally locked to the housing (10) by means of the first clutch (19), c) The further cage (25) has eccentric bearings for the further planetary ring (26), can be rotationally locked to the internal gear (11) by means of the third clutch (29), and when rotating as a whole can be rotationally locked by means of the second clutch (20) to one of the members (11, 12, 23) of the planetary gear train.

10. The reduction gear as claimed in claim 9, characterized in that the third clutch (29) is a clutch having two switching positions, which is controlled by the control as a function of a temperature.

\* \* \* \* \*